US008284383B2

(12) United States Patent
Beppu et al.

(10) Patent No.: US 8,284,383 B2
(45) Date of Patent: Oct. 9, 2012

(54) OBJECT RECOGNITION APPARATUS UTILIZING BEAM SCANNING FOR DETECTING WIDTHS OF OBJECTS OF VARIOUS SIZES AND LOCATED AT VARIOUS RANGES

(75) Inventors: Taro Beppu, Obu (JP); Kiyokazu Takagi, Okazaki (JP); Takashi Ogawa, Nagoya (JP); Hiroshi Hazumi, Nagoya (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 12/927,923

(22) Filed: Nov. 30, 2010

(65) Prior Publication Data
US 2011/0128547 A1 Jun. 2, 2011

(30) Foreign Application Priority Data

Dec. 2, 2009 (JP) ................. 2009-274592

(51) Int. Cl.
*G01C 3/08* (2006.01)
*G01S 13/93* (2006.01)
*G06K 9/46* (2006.01)
(52) U.S. Cl. ............. 356/4.07; 356/3.03; 356/3.06; 342/70; 342/71; 382/103; 382/190
(58) Field of Classification Search .......... 356/601, 356/607–608, 614, 622, 628, 629, 634–640, 356/445, 3.03, 3.06, 3.07, 4.07, 28; 342/70, 342/71, 72, 85, 99, 118; 250/234, 559.22, 250/559.23, 214.1, 566; 382/103, 104, 115, 382/125, 126
See application file for complete search history.

(56) References Cited

U.S. PATENT DOCUMENTS

| 5,754,099 | A  | * | 5/1998  | Nishimura et al. ........... 340/435 |
|-----------|----|---|---------|--------------------------------------|
| 6,429,804 | B1 | * | 8/2002  | Kishida et al. ................. 342/70 |
| 6,650,235 | B2 | * | 11/2003 | Shirai et al. .................. 340/435 |
| 6,927,699 | B2 | * | 8/2005  | Samukawa et al. ........... 340/903 |
| 7,136,753 | B2 | * | 11/2006 | Samukawa et al. ........... 701/301 |
| 7,602,477 | B2 | * | 10/2009 | Nakamura et al. .......... 356/4.07 |
| 2001/0052844 | A1 |   | 12/2001 | Shirai et al. |
| 2005/0093735 | A1 | * | 5/2005  | Samukawa et al. ............. 342/70 |
| 2005/0200833 | A1 | * | 9/2005  | Nakamura et al. .......... 356/4.07 |
| 2006/0103927 | A1 | * | 5/2006  | Samukawa et al. .......... 359/436 |
| 2009/0208109 | A1 | * | 8/2009  | Kakinami et al. ............ 382/190 |

FOREIGN PATENT DOCUMENTS

JP 2002-022831 1/2002

* cited by examiner

*Primary Examiner* — Sang Nguyen
(74) *Attorney, Agent, or Firm* — Harness, Dickey & Pierce, PLC

(57) ABSTRACT

An object recognition apparatus performs a sweep of a scanned region by transmitting scanning wave beams at respective scan angles and successive timings, derives a received-wave signal strength value and reflection location corresponding to each scan wave beam during the sweep, and assigns a set of mutually adjacent reflection locations as a segment. A corresponding range value of the segment is calculated, expressing an estimated distance of a detected object. A threshold value is derived in accordance with the segment range, a region of the segment in which the signal strength values exceed the threshold value is extracted, and the width of the extracted region is designated as the width of the detected object.

11 Claims, 15 Drawing Sheets

(WHEN BEAM SPREAD ANGLE IS 0.5°)

(WHEN BEAM SPREAD ANGLE IS 0.125°)

(OBJECT POSITIONED AT UPPER RANGE LIMIT)

(OBJECT POSITIONED BEYOND UPPER RANGE LIMIT)

(OBJECT RANGE BETWEEN UPPER AND LOWER RANGE LIMITS)

(OBJECT RANGE BELOW LOWER RANGE LIMIT)

US 8,284,383 B2

OBJECT RECOGNITION APPARATUS UTILIZING BEAM SCANNING FOR DETECTING WIDTHS OF OBJECTS OF VARIOUS SIZES AND LOCATED AT VARIOUS RANGES

CROSS-REFERENCE TO RELATED APPLICATIONS

This application is based on and incorporates herein by reference Japanese Patent Application No. 2009-274592 filed on Dec. 2, 2009.

BACKGROUND OF THE INVENTION

1. Field of Technology

The present invention relates to an object recognition apparatus installed in a vehicle, which transmits waves within a region ahead of the vehicle for detecting objects located in that region based upon resultant reflected waves, and in particular for detecting the widths of such objects.

2. Description of Related Art

Types of object recognition apparatus for installation in a vehicle (referred to in the following as the host vehicle) are known, whereby laser light beams or beams of millimeter-range radio waves are scanned within a region ahead of the host vehicle, with objects within that regions (in particular, other vehicles) being detected based on resultant received reflected waves. The detection results may be used to generate warning indications of an obstacle (such as a preceding vehicle) ahead of the host vehicle, or may be used in controlling the separation distance between the host vehicle and a preceding vehicle.

Such an object recognition apparatus may employ laser light beam scanning, in which pulse light beams are transmitted in successive azimuth directions (successive scan angles) to scan a predetermined angular region extending ahead of the host vehicle. By determining the range (distance from the host vehicle) of a detected object, the angular resolution of the scanning and the number of beams from which waves are reflected back from the object, the object width can be calculated.

Specifically, designating the angular resolution of scanning as $\theta(°)$, the width of a detected object as W, and the range of the detected object as Z, the following relationship can be established:

$$W = \text{number of reflected beams} \times \theta \times (\pi/180°) \times Z$$

However the above equation assumes that there is no overlapping between adjacent beams, whereas in actuality, it is not possible to transmit beams having ideal cut-off characteristics, such as illustrated in FIG. 10A. An actual transmitted beam is widened by having a wide low-intensity "skirt" region, in which intensity values are up to 0.5 times the peak intensity of the beam. This is illustrated in FIG. 10B, showing an example of the beam pattern of an actual transmitted beam. The effective angular beam width is thus greater than the ideal value.

As a result, overlapping occurs between adjacent beams, so that the above equation is not actually valid, since the angular resolution of scanning is reduced. Hence the width of a detected object may be estimated as greater than the actual width.

This effect of decreased resolution of beam scanning is more severe for laser light beam scanning than for scanning by millimeter-range electromagnetic waves.

A method intended to achieve more accurate estimation of detected object width, for such a beam scanning type of object recognition apparatus has been proposed in Japanese Patent Laid-Open No. 2002-022831. With that method, received-light signal strength values corresponding to reflected light from respective beams are each compared with a threshold value. Signal strength values below the threshold value are discarded (as resulting from overlapping of transmitted beams, scattering of light, etc.), and values above the threshold are judged to be valid. Each time a complete beam sweep is performed and resultant received signal data acquired for each of the beams, the data are examined to find if they express a detected object width that exceeds a predetermined maximum width. If the maximum width is exceeded, the threshold value is adjusted, in a direction for reducing the detected object width. In that way, as successive sweeps occur, the detected object width becomes limited to the predetermined maximum value. For example if the anticipated maximum width of objects to be detected is approximately 2.5 m, then the threshold is adjusted such that the maximum detected width is restricted to a somewhat larger value, e.g., 2.6 m.

This reference document also teaches that the peak value of received-light signal strength corresponding to a detected object may be obtained, and the aforementioned threshold set as a fixedly predetermined proportion of the peak value.

This reference document also teaches that the rate of change of a set of received-light signal strength data, at a point of intersection with the threshold value, can be evaluated and used to judge whether received signal data values exceeding the threshold value are to be used as valid data. Specifically, if the rate of change is more gradual than a specific degree, the data are discarded (are judged to result from scattering of light), while if the rate of change is sufficiently abrupt, signal strength values above the threshold value are accepted as being valid.

However that method has the following disadvantage. If the object to be recognized has low reflectivity, then the reflected light from the object may be judged to be scattered light, so that object recognition will not be achieved.

In addition, the following disadvantage occurs in the case of the above method whereby the threshold value is adjusted to restrict the maximum object width that is detected. A plurality of objects may be detected concurrently, with the objects being of respectively different widths and/or different ranges. In that case, as illustrated in FIGS. 5A, 5B (for the case of two detected objects), the received-light signal strength data corresponding to one of the objects may have a peak value substantially different from the peak value corresponding to the other detected object. In that case, there is only a single threshold value, adjusted appropriately with respect to the higher one of the peak values, then all of the received-light signal strength data corresponding to the other detected object may be below that adjusted threshold value. Hence, only the width of one of the two objects will be detected.

A similar disadvantage occurs in the case of the above method whereby the threshold is set as a fixed proportion of the peak value of received-light signal strength corresponding to a detected object. In that case too, since only a single threshold is utilized, it is not possible to achieve accurate width estimation of a plurality of objects which may be of various widths and/or located at various different distances, and so correspond to a plurality of respectively different peak values of received-light signal strength.

SUMMARY OF THE INVENTION

It is an objective of the present invention to overcome the above problems, by providing an object recognition apparatus which provides greater accuracy and reliability of detecting object width than has been possible hitherto. In particular, it is an objective to provide an object recognition apparatus enabling reliable estimation of widths of each of a plurality of concurrently detected objects, irrespective of differences between the ranges of the objects.

To achieve that objective, the invention provides an object recognition apparatus which transmits scan wave beams (referred to in the following simply as scan beams) as pulses along respective azimuth scan directions in successive pulse intervals, obtains received-light signal pulses (corresponding to respective scan beams) from resultant reflected waves that are received from a detected object, and thereby derives data for estimating the width of a detected object, with inaccuracy due to reduced angular resolution caused by overlap between adjacent scan beams being substantially eliminated.

After each completion of a beam sweep (successive scanning by all of the beams), the received signals are processed as follows. For each scan beam, a corresponding received-light signal strength value, scan angle, and range value (distance of the corresponding reflection location) are derived, as a measurement data set corresponding to that scan beam.

The term "segment" is used herein to refer to a single reflection location or a set of reflection locations which are located mutually closely adjacent, as determined by specific conditions described hereinafter. Each reflection location is a position from which light of a corresponding scan beam is reflected from an object, and is detected as a received-light signal pulse which exceeds a minimum signal strength level (i.e., noise level). A segment may correspond to a single detected object, or to a plurality of mutually adjacent objects.

A corresponding threshold value, referred to as a region extraction threshold value, may be derived for a segment. The region extraction threshold value is derived such as to decrease (relative to the peak received-light signal strength of the segment) in accordance with decrease of a range value that is estimated for the segment. A region of the segment in which signal strength values are higher than the threshold value is then extracted, and the width of that extracted region is designated as being the width of a detected object.

Preferably, such region extraction processing is applied only to segments (referred to herein as over-size segments) which are judged to exceed predetermined maximum values of width and/or received-light signal strength. The predetermined maximum width can for example be set as the average width of a typical detected object such as an automobile.

The purpose of varying the threshold value applied to a segment in accordance with the range of the segment can be summarized as follows. The term "beam spread angle" as used herein signifies an angular extent of a scan beam, within which the beam intensity is between a peak value and ½ of that peak value. The term "object position beam width" signifies the width of a scan beam at the range of a detected object. An object range at which the object position beam width becomes identical to the object width is referred to as the "upper range limit" (with respect to that specific object width). An object range at which the object position beam width becomes half of the object width is referred to as the "lower range limit" (with respect to that specific object width). With the present invention, the region extraction threshold value is reduced from a maximum value (preferably ½ of the peak received signal strength of a segment) to a substantially lower value (e.g., 0.01 times the peak received signal strength) as the object range decreases from the upper range limit to the lower range limit. This is done to prevent underestimation of the object width.

Specifically, the object width is estimated as the scanning beam width at the estimated object range (segment range) multiplied by the number of scan beams which are reflected from the object. As the object range decreases below the upper range limit, only a part of a scan beam may be reflected from an edge portion of a detected object, with the width of such a portion varying in accordance with object range. If the received signal strength corresponding to the resultant reflected light from such a partially illuminated portion of the object is below the threshold value, then the estimated object width will less than the actual object width. With the present invention, by appropriately decreasing the region extraction threshold value in accordance with such decrease in object range, underestimation of the object width is prevented.

When the object range is greater than the upper range limit, the region extraction threshold is preferably held fixed at a suitably high value, e.g., ½ of the peak value of received-light signal strength of a segment. This serves to prevent overestimation of detected object width due to overlap between adjacent scan beams.

Improved accuracy of estimating the widths of objects at various ranges can thereby be achieved, while minimizing the adverse effects of a non-ideal beam pattern of the scan beams (causing beam overlapping) upon the actual angular resolution of scanning.

Another aspect of the invention lies in enabling the respective widths of a plurality of concurrently detected objects to be accurately estimated, even if the angular directions of the objects are adjacent to one another and the objects are at respectively different ranges. Specifically, each over-size segment is examined to determine whether it contains a plurality of peak values of received-light signal strength. If such a plurality are found, the over-size segment is separated into respective segments each having a single peak. Each of these is then processed to obtain the widths of respectively corresponding detected objects.

The above features of the invention are set out in more detail in the following, referring to a specific embodiment.

The processing and control functions of such an object recognition apparatus are preferably implemented by a computer, through execution of a program. The program may be loaded (by a computer system, when the program is required) from a recording medium such as a floppy disk, opto-magnetic disk, CD-ROM, hard disk, etc. Alternatively, the program may be downloaded to the computer system via a communication network and activated when required. As a further alternative, the program may be held stored on a recording medium such as a ROM or backup RAM which is an integral part of the computer system, and read out when required.

BRIEF DESCRIPTION OF THE DRAWINGS

FIG. 10A shows an example of an ideal beam pattern of a scan beam, while

DESCRIPTION OF PREFERRED EMBODIMENTS

Figure 1:
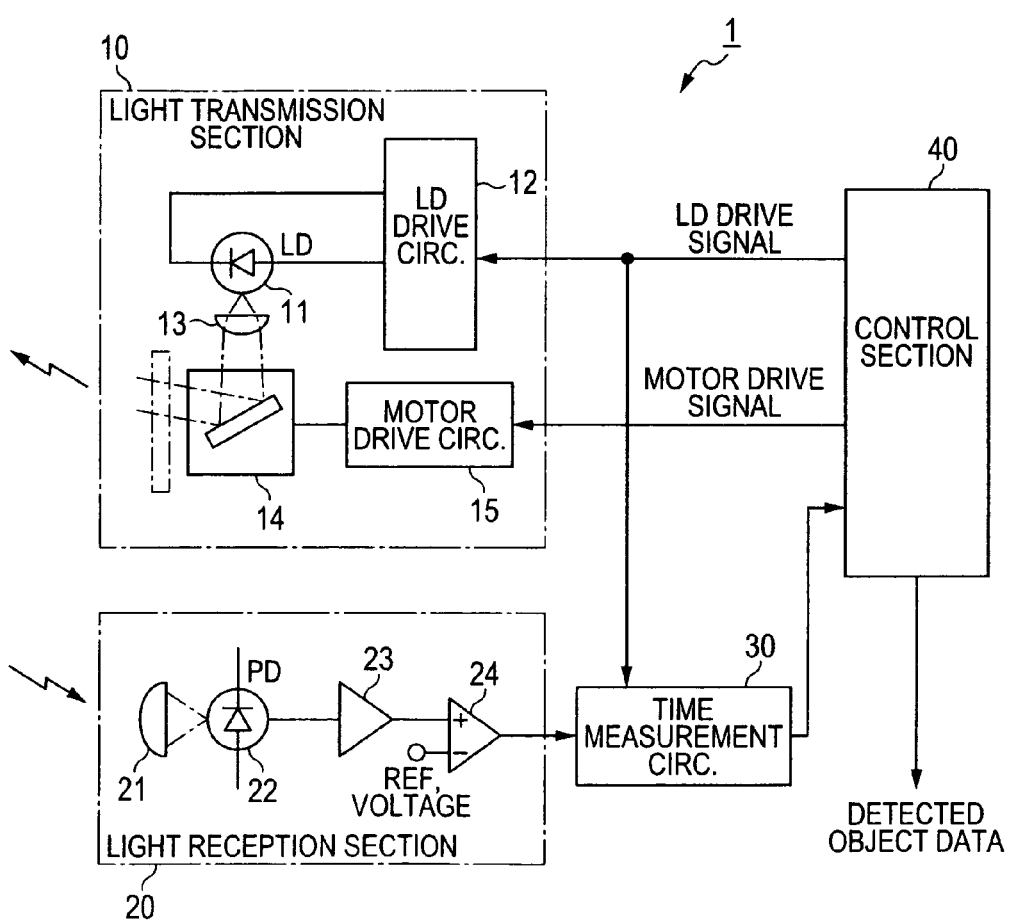
FIG. 1 shows the overall configuration of an embodiment of an object recognition apparatus.

FIG. 1 is a block diagram showing the overall configuration of an embodiment of an object recognition apparatus, designated by numeral 1, which is installed in a vehicle referred to in the following as the host vehicle. The center of the object recognition apparatus 1 is assumed to be located on a central front/back axis of the host vehicle. The object recognition apparatus 1 serves to detect objects located ahead of the host vehicle and generate object data corresponding to each detected object, with the data specifying the estimated position and width of the object. The detected object data obtained by the object recognition apparatus 1 are supplied to a vehicle control apparatus (not shown in the drawings), for use in generating warning indications to the vehicle driver when a detected object is judged to be within a predetermined warning region. In addition (when the detected object is a candidate preceding vehicle) the detected object data may be applied for intra-vehicle distance control purposes, with the vehicle braking, throttle adjustment and operation of the automatic transmission, etc., being automatically controlled in accordance with the status of a preceding vehicle.

Overall Configuration

As shown in FIG. 1, the object recognition apparatus 1 is made up of a light transmitting section 10, a light reception section 20, a time measurement circuit 30 and a control section 40. The light transmitting section 10 transmits laser light beams which scan a region ahead of the host vehicle, with the light beams being transmitted as respective pulses at successive timings. The light reception section 20 receives resultant reflected light from detected objects, and generates received-light pulse signals respectively corresponding to the transmitted beams, which are supplied to the time measurement circuit 30. The time measurement circuit 30 serves to measure the difference between timings of transmitting a light beam and reception of a resultant received-light signal pulse. The time measurement circuit 30 also converts the pulse width of each received-light signal pulse to a corresponding value of received-light signal strength. The control section 40 generates drive signals for driving the light transmitting section 10 and receives the time measurement and received-light signal strength results obtained by the time measurement circuit 30, and generates the aforementioned object data (position, width) for each detected object based on these.

Light Transmitting Section

The light transmitting section 10 is made up of a laser diode 11, a laser diode drive circuit 12, a light transmission lens 13, a scanner 14 and a motor drive circuit 15. The laser diode 11 generates successive pulses of laser light for constituting the transmitted scan beams. The light from the laser diode 11 is first passed through the lens 13, for focusing the beam to a predetermined beam spread angle (with this embodiment, 0.25°). The scanner 14 contains a mirror which reflects the light that is transferred through the lens 13, with the mirror being movably mounted to permit swinging motion, and being repetitively swung through a fixed azimuth angular range by a motor (not shown in the drawings). The motor is driven by the motor drive circuit 15 in accordance with the motor drive signal supplied from the control section 40, such that the laser light pulses from the laser diode 11 are generated at timings of successive angular positions of the mirror of the scanner 14. The laser light beams are thereby scanned within a fixed azimuth range extending directly ahead of the host vehicle and centered on the back/front central axis of that vehicle.

The light transmitting section 10 of this embodiment, constituted as described above, corresponds to scan beam transmitting means as recited in the appended claims. However the invention is not limited to the specific configuration described for the light transmitting section 10.

Figure 10A:
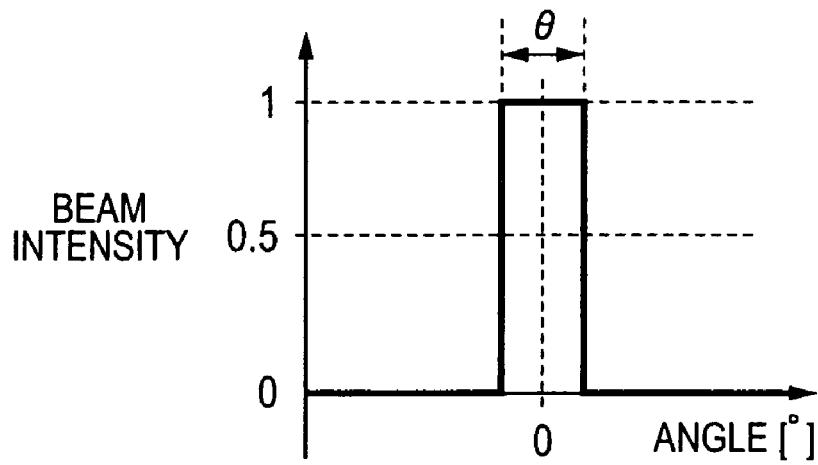
Figure 10B:
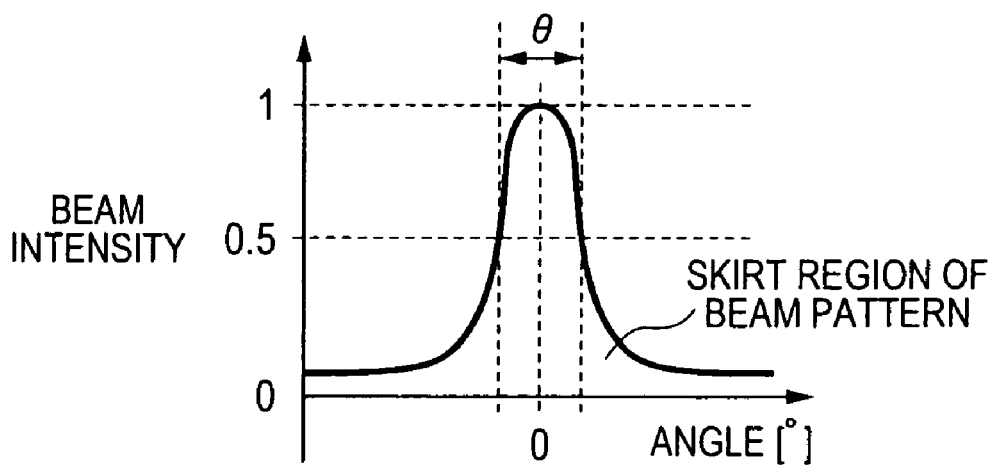
FIG. 10B shows an example of an actual beam pattern.

The term "beam spread angle" of a transmitted beam, as used herein, signifies an angular extent of the beam within which the intensity of transmitted waves is between a peak value of intensity and ½ of that peak value, as illustrated by the angle θ in FIG. 10B.

Designating the straight-ahead central axis of the host vehicle as the 0° direction (i.e., assuming the object recognition apparatus to be located on that central axis), the scanned range is ±18° in azimuth, achieved by shifting the scan angle (beam direction) in 144 successive 0.25° steps, and with the beam spread angle being 0.25°. The successively transmitted beams are numbered from 0 to 143.

Light Reception Section

The light reception section 20 includes a light reception lens 21, a photodiode 22, an amplifier 23 and a comparator 24. The lens 21 serves to focus reflected laser light, received from a detected object, onto the photodiode 22. The photodiode 22 thereby generates a reception signal at a strength in accordance with the intensity of the received light. The amplifier 23 amplifies the reception signal from the photodiode 22, and the amplified signal is applied to a non-inverting input of the comparator 24. A fixed reference voltage is applied to the inverting input of the comparator 24. A light reception pulse signal is thereby outputted from the comparator 24 each time the level of output signal from the amplifier 23 exceeds the reference voltage.

Figure 2A:
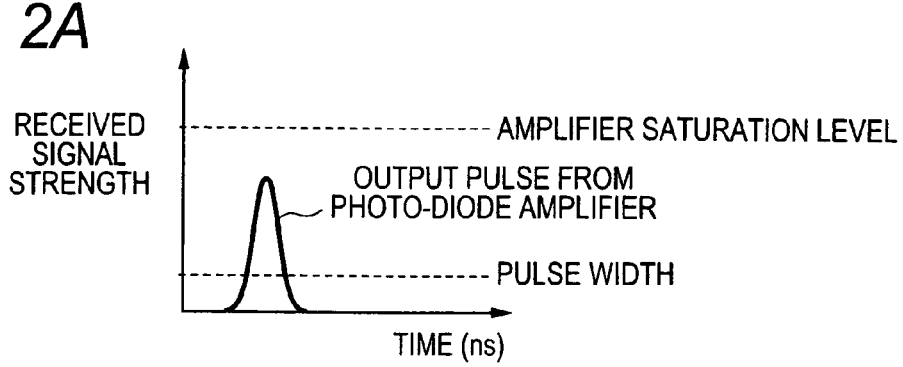
FIGS. 2A to 2D are diagrams illustrating relationships between received signal strength and pulse width, of received signals of an amplifier.
Figure 2B:
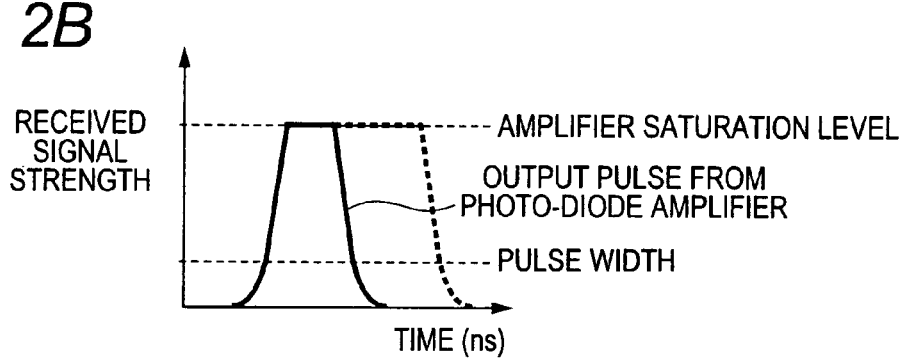

The amplifier 23 is formed of bipolar transistors, and has the following characteristics. When a pulse of reflected laser light beam is received, the intensity of the received light may be such that the level of output signal from the photodiode 22 remains below the saturation threshold of the amplifier 23. In that case, the output signal strength from the photodiode 22 (referred to in the following as the received-light signal strength) varies with time as illustrated in the example of FIG. 2A. However if the intensity of the received light is such that the received-light signal strength exceeds the saturation threshold of the amplifier 23, the output signal values from the amplifier 23 become saturated, as illustrated in FIG. 2B. In that condition, due to a minority carrier storage effect in the transistors of the amplifier 23, the greater the amplitude of an output signal pulse from the photodiode 22 (i.e., the higher the received-light signal strength of the pulse), the more delayed will become the trailing edge of a resultant output pulse from the amplifier 23 This is indicated by the thick dotted-line portion in FIG. 2B.

The pulse width of an output pulse from the amplifier 23 (as expressed by the output pulse width from the comparator 24) is approximately proportional to the logarithm of the received-light signal strength. For that reason, even if the output of the amplifier 23 becomes saturated, so that the received-light signal strength resulting from a transmitted beam pulse cannot be directly obtained based on the output signal level of the amplifier 23, the received-light signal strength can be estimated based upon the width of an output pulse from the comparator 24.

Figure 2C:
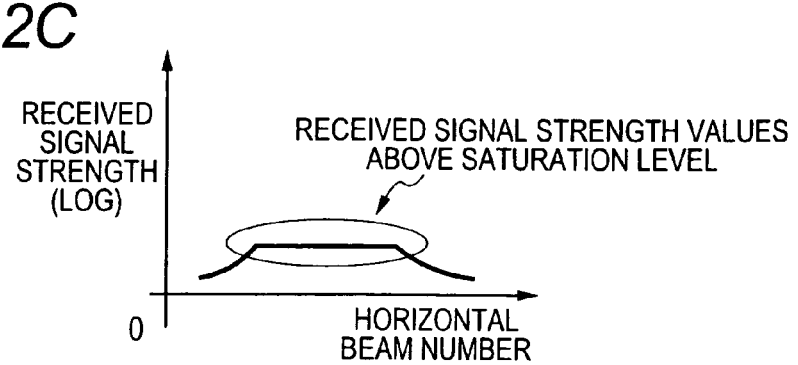
Figure 2D:
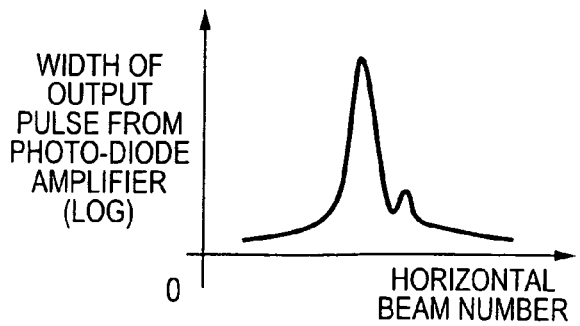

FIG. 2C illustrates the case in which throughout most of a scan sweep, the received-light signal strength values corresponding to respective transmitted beams exceed the saturation level of the amplifier 23. FIG. 2D shows a corresponding variation of logarithmic pulse width values of output pulses from the amplifier 23. This variation substantially corresponds to the variation of received-light signal strength values.

Since the transmitted laser light beams are transmitted in horizontal (azimuth) directions, they are referred in general as horizontal beams in the following.

The light reception section 20 of this embodiment, constituted as described above, corresponds to received wave detection means as recited in the appended claims. However the invention is not limited to the specific configuration described for the light reception section 20.

Time Measurement Circuit

Each time a horizontal beam is transmitted as a pulse by the light transmitting section 10, at a timing determined by the drive signal LD and in a direction determined by the motor drive signal, and a resultant reflected light pulse is received by the light reception section 20, the time measurement circuit 30 obtains the phase difference Tp between the transmission timing of a scan beam pulse and the timing of a corresponding (received-light signal) output pulse produced from the light reception section 20. The time measurement circuit 30 further measures the duration of that output pulse from the light reception section 20, with that duration being designated as the received-light pulse width Tw.

Each of such pairs of values of Tp and Tw are supplied as measurement data (corresponding to a specific transmitted beam) to the control section 40 together with information specifying the corresponding scan angle. The scan angle can be represented by the number (in the range 0 to 143) assigned to the corresponding horizontal beam.

Control Section

The control section 40 is constituted by a usual type of microcomputer, having a CPU, ROM, RAM, etc.

The ROM holds stored therein a program executed by the CPU to perform processing as described hereinafter. The ROM also stores a coefficient table, for use in obtaining values of the threshold coefficient $\alpha$, used in setting the appropriate region extraction threshold value THa for a segment. The region extraction threshold value THa is used in extracting a specific region from a segment (a region in which received-light signal values exceed THa), with the width of the extracted region being specified as the width of a detected object.

Before describing a specific processing routine that is executed by the control section 40, the basis for this processing is summarized in the following.

Each time a scan sweep (transmission of 144 successive horizontal beams, as respective pulses) has been completed, the control section 40 processes the data thereby obtained corresponding to each of the transmitted beams (received-light signal strength value, timing data, scan angle), to obtain respective reflection locations corresponding to the transmitted beams. Specifically, the range (as measured along the beam direction) of each reflection location is first calculated based on the timing information and the speed of light. Each reflection location is thereby expressed in polar coordinates (scan angle and range values). That information is then converted to an XZ rectangular coordinate system in which the X axis is the width direction of the host vehicle, the Z axis corresponds to the straight-ahead central axis of the vehicle, and the origin is the center of the object recognition apparatus. The reflection location data are then examined to find any segments.

Figure 13:
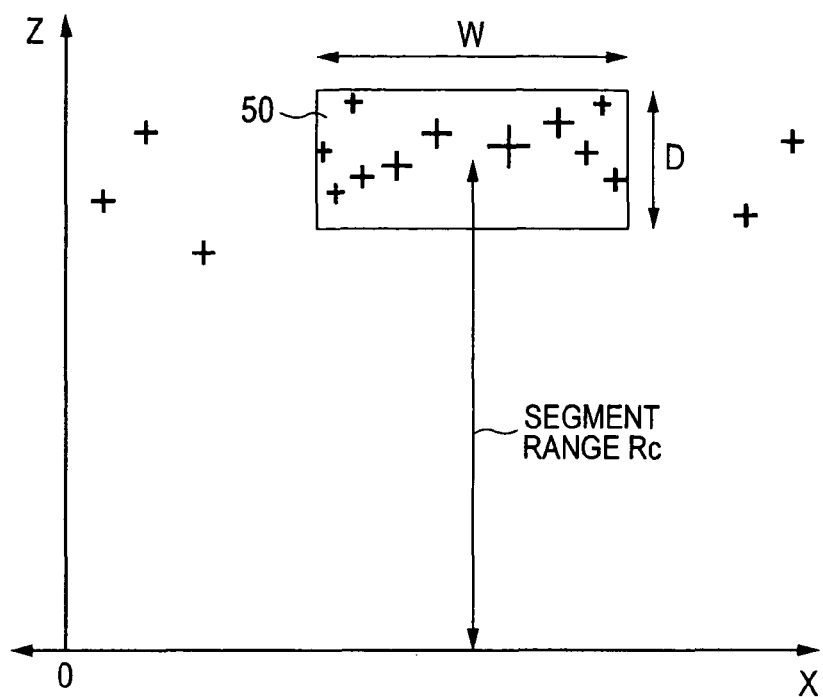
FIG. 13 is a conceptual diagram illustrating reflection locations and corresponding received-light signal strength values of a segment.

Reflection locations corresponding to respective transmitted beams, are illustrated conceptually in FIG. 13 by cross symbols, with the size of each cross indicating the corresponding received-light signal strength. Each received-light signal strength value is calculated by the control section 40 based on the width of a corresponding received-light signal pulse, as described above.

As shown in FIG. 13, when a set of reflection locations are located mutually adjacent in accordance with predetermined spacing conditions (described hereinafter) with these locations expressed in the XZ rectangular coordinate system, they are processed as belonging to a specific segment such as the segment 50, having a width (X-axis) dimension W, depth (Y-axis) dimension D, and segment range value Rc (Z-axis value of center of the segment).

Figure 14:
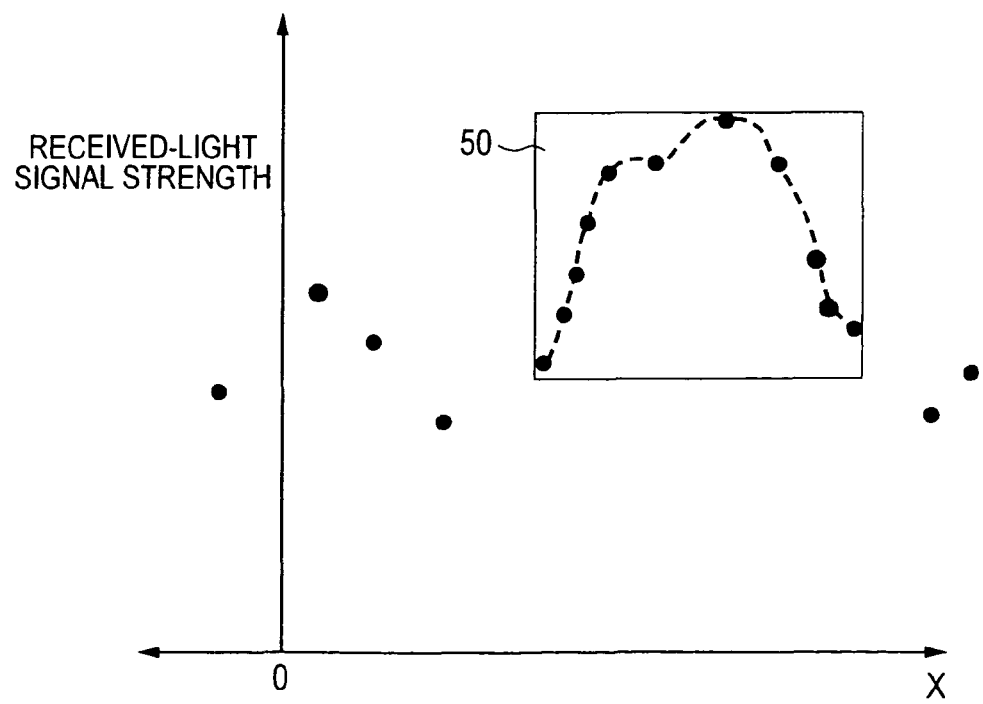
FIG. 14 is a graph corresponding to FIG. 13 illustrating received-light signal strength distribution of a segment.

The received-light signal strength distribution of the segment 50 of FIG. 13 is indicated as a broken-line portion in FIG. 14. In this example, the segment has a single peak value of received-light signal strength.

With this embodiment, if a segment satisfies predetermined conditions (the width W does not exceed a predetermined maximum width and the peak received-light signal strength of the segment does not exceed a predetermined maximum signal strength), the segment width W is directly specified as being the width of a corresponding detected object. Otherwise, the segment is designated as an over-size segment.

A segment may be an over-size segment due to widening caused by the skirt portions of transmitted beams (described above referring to FIG. 10B), or because the segment corresponds to a plurality of objects located along adjacent directions. Similarly, an excessive peak value of received-light signal strength of a segment may be because the segment corresponds to a plurality objects located along adjacent directions.

Hence, each over-size segment is examined to find if it contains a plurality of peak values of received-light signal strength. If it contains only a single peak, a value of threshold coefficient α corresponding to the segment range is obtained from a coefficient table (configured as described hereinafter) whose data are held stored in the ROM of the control section 40. The peak value of received-light signal strength of the segment is then multiplied by that value of α to obtain the corresponding region extraction threshold value THa. A specific region of the segment, within which that threshold value is exceeded, is then extracted. The width of that extracted region is then specified as being the width of a corresponding detected object.

However if the over-size segment is judged to contain a plurality of peaks, the peak regions are first separated, then processed separately to obtain the widths of corresponding detected objects.

Figure 5A:
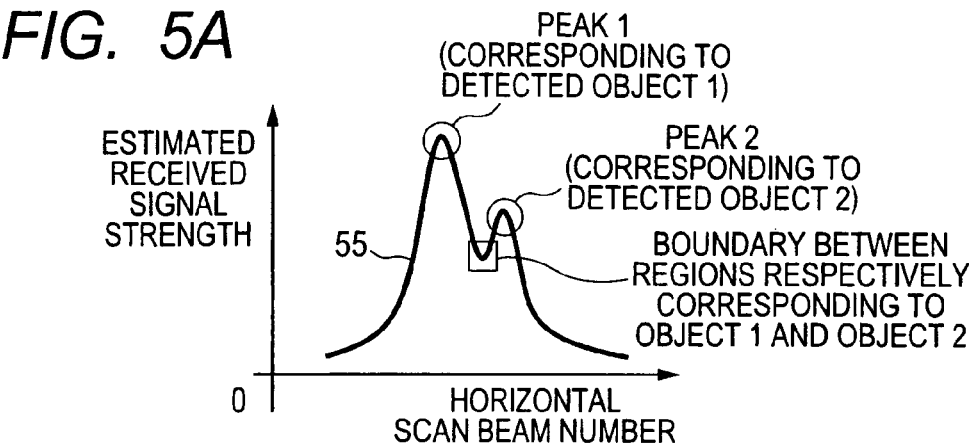
FIGS. 5A to 5C are diagrams for illustrating segment separation.
Figure 5B:
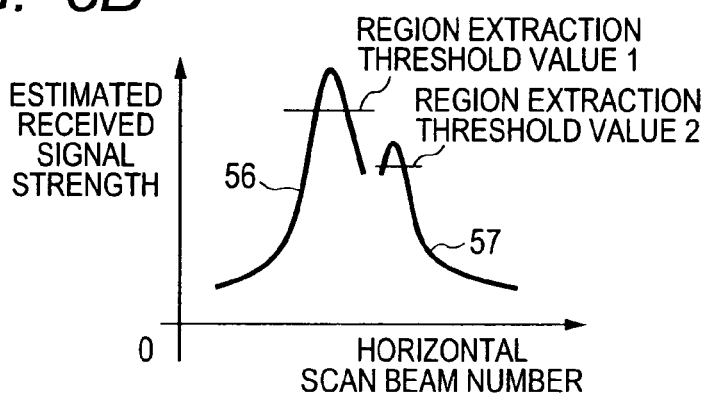
Figure 5C:
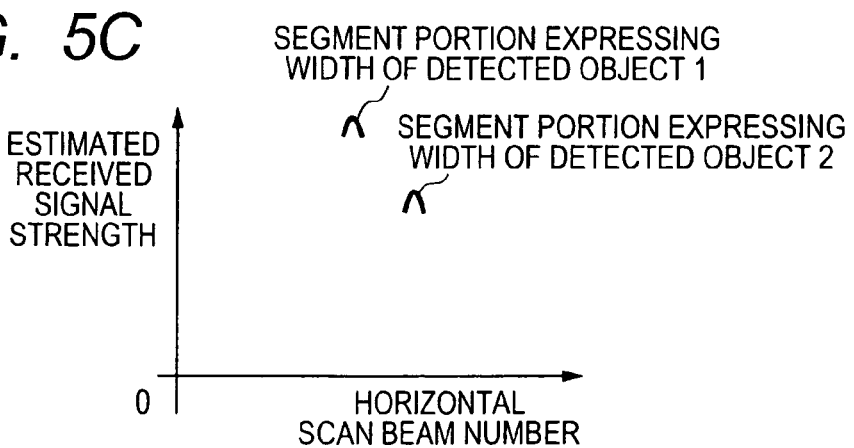

FIG. 5A illustrates the received-light signal strength distribution within an over-size segment which contains two peak values of received-light signal strength. As illustrated, an angular direction corresponding to the lowest value of received-light signal strength between the two peaks is obtained (e.g., as a scan beam number), and peak regions (57, 58) are thereby separated to form two segments as shown in FIG. 5B. Respective values of region extraction threshold value THa are then obtained for these separated segments, and respective extracted regions thereby derived. The widths of these extracted regions are then specified as the widths of respective detected objects corresponding to the separated segments, as illustrated in FIG. 5C.

Alternatively, the width of each separated segment could be specified directly as the width of a corresponding detected object. As a further alternative, region extraction could be performed for a separated segment only if it is judged to be an over-size segment.

The upper limit of segment width and upper limit of peak received-light signal strength, used to judge whether a segment is an over-size segment, may be set as predetermined fixed values. Alternatively, these could be varied in accordance with the segment range Rc.

If a fixed upper limit is set for judging an over-size segment, that limit could be set for example as the average width of a single typical detected object (e.g., automobile), incremented by a specific amount. Similarly, a fixed allowable upper limit of peak received-light signal strength for a segment may be set based upon the average received-light signal strength expected to be received when a single typical type of detected object is scanned.

Furthermore, the decision as to whether to designate a segment as an over-size segment could be made based upon the segment width alone, or upon the peak received-light signal strength of the segment alone, or made based upon both of these (i.e., a segment is designated as an over-size segment only if both the maximum width limit and also the maximum peak received-light signal strength limit are exceeded).

Through control signals generated by the control section 40, successive scan sweeps are performed repetitively with a fixed sweep period (100 ms, with this embodiment). LD (laser diode) drive signals are outputted by the control section 40 at fixed intervals (with this embodiment, 166.7 microsecond intervals), i.e., 144 times in each sweep, synchronized with the motor drive signal.

Processing Performed by Control Section

Figure 4:
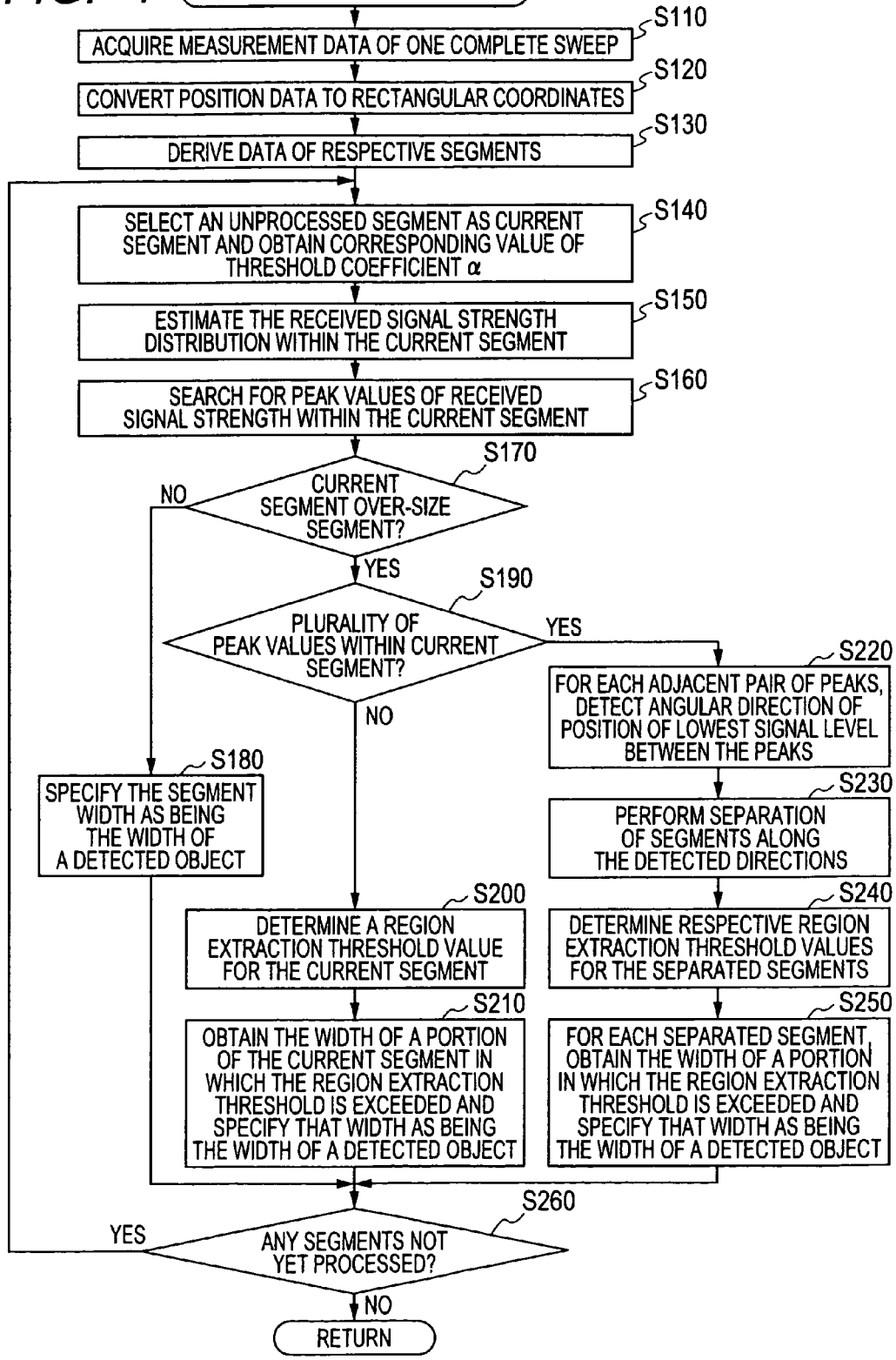
FIG. 4 is a flow diagram showing the contents of object recognition processing that is executed by a control section of the embodiment.

Object recognition processing, for detecting objects within the scan range and estimating the width and position of each of these objects, is performed by the control section 40 in accordance with the flow diagram of FIG. 4. The processing routine shown in FIG. 4 is executed each time a scan sweep has been completed and measurement data sets corresponding to each of the scan beams have been acquired and temporarily stored. Each measurement data set includes a received-light pulse width value Tw, a scan angle φ (determined by the corresponding scan beam number), and phase difference value Tp (difference between the beam transmission timing and the timing of resultant received-light signal pulse). Firstly, these measurement data sets are read out (step S110). Next (step S120), for each of the measurement data sets, the received-light pulse width data are processed. Firstly, those data sets in which the received-light pulse width value Tw is below a predetermined threshold are eliminated, as a noise component (due to scattered light, etc).

Next, for each of the remaining measurement data sets, a corresponding range value R is calculated as (C×Tp/2) where C is the speed of light. A corresponding reflection location is thereby specified, in polar coordinates (R, φ). Each reflection location is then converted to the aforementioned XZ rectangular coordinate system.

In the succeeding step, (step S130) segmentation processing is performed on the converted reflection location positions.

Specifically, if two reflection locations are located respectively adjacent such as to satisfy the following conditions, they are designated as belonging to the same segment. The conditions are that the difference ΔX between their respective x-coordinates is less than or equal to 0.2 m, and the difference ΔZ between their respective Z-coordinates is less than or equal to 2 m. Each segment is expressed by segment data which includes at least a width value W (X-direction dimension) and depth value D (Z-axis dimension), a center position (X, Z) (and hence, a segment range Rc), and the beam numbers of two beams which respectively intersect the right side and left side of the segment.

In succeeding steps, from step S140, the segments derived in step S130 are successively processed. The segment currently being processed is referred to in the following as the current segment. Firstly (step S140) a segment which has not yet been processed is selected as the current segment, and the segment range Rc is then obtained as the Z-axis distance of the center of the segment from the object recognition apparatus. The threshold coefficient α corresponding to the segment range Rc is then read out from the coefficient table, whose contents are shown graphically in FIG. 3.

Next in step S150, the received-light pulse width values Tw of the current segment are converted to corresponding received-light signal strength values, as described hereinabove. The distribution of received-light signal strength in the current segment is thereby obtained.

Next in step S160, the maximum (highest peak) value of the signal strength distribution found in step S150 is detected. A decision is then made (step S170) as to whether the current segment is an over-size segment, as defined hereinabove.

Specifically, a judgment is made as to whether the width W of the current segment exceeds the predetermined allowable upper limit of width, or the highest value of the received-light signal strength distribution of the segment exceeds a predetermined upper limit of signal strength. If either of these limits is exceeded, the current segment is judged to be an over-size segment.

If it is found in step S170 that the current segment is not an over-size segment, then (step S180), the width W of the current segment is specified as being the width of a corresponding detected object. Step S260 is then executed.

However if it is found in step S170 that the current segment is an over-size segment, then a decision is made (step S190) as to whether that segment contains a plurality of peak values of received-light signal strength, based on the signal strength distribution obtained for that segment in step S160. If the segment contains only a single peak value, then step S200 is executed, in which threshold value setting is performed. Specifically, designating the peak value of received-light signal strength of the current segment as Ap, this is multiplied by the threshold coefficient α that has been obtained for the current segment in step S140, to obtain the region extraction threshold value THa (THa=Ap×α). S210 is then executed, to extract a region of the current segment in which the received-light signal strength distribution exceeds the region extraction threshold value THa. The width of that extracted region is then specified as being the width of a corresponding detected object. Step S260 is then executed.

If it is found in step S190 that the current segment contains a plurality of received-light signal strength peak values, step S220 is then executed. In step S220, for each pair of adjacent peak values, processing is performed to find the scan angle which corresponds to the lowest received-light signal strength value between these two peak values, as illustrated in FIG. 5A. The over-size segment is then separated into two segments by being divided along the scan angle direction thus found (step S230), i.e., by assigning portions of the over-size segment (disposed on opposing sides of the direction obtained) to respective ones of two separated segments. This is illustrated in FIG. 5B.

Next in step S240, respective values of segment range Rc of the separated segments are estimated, and are use to obtain corresponding values of threshold coefficient α from the coefficient table. Region extraction threshold values THa are thereby calculated for each of the separated segments, by multiplying the peak received-light signal strength Ap of each separated segment by the corresponding value of α. These separate region extraction threshold values THa are illustrated in FIG. 5B.

The values of peak received-light signal strength Ap for the separated segments may be derived from the signal strength distribution information which was calculated for the original current segment in step S150. Alternatively, signal strength distribution information may be derived for each of the separated segments in step S240, and the respective values of peak received-light signal strength value Ap then obtained for these separated segments based on the derived distribution information.

As a further alternative in executing step S240, instead of deriving separate values of the threshold coefficient α for the separated segments, it may be possible to utilize the original value of α which was obtained for the original over-size current segment in step S140.

Next in step S250 (for each of the separated segments), as described above for step S210, a region of a segment within which received-light signal strength values exceed the corresponding region extraction threshold value THa is extracted. The width of the extracted region is designated as the width of a detected object, whose range value is the segment range Rc. Step S260 is then executed.

In step S260, a decision is made as to whether all of the segments determined in step S130 have been processed. If any have not yet been processed, S140 and subsequent steps are repeated for a remaining segment, as described above. If all segments have been processed, this execution of the object recognition processing routine is ended.

In the above it is assumed that the separated segments obtained in step S230 are each processed as an over-size segment having a single peak value of received-light signal strength. However it would be equally possible to judge the width of each of the separated segments, and apply a region extraction threshold value THa only in the case of an over-size segment, while otherwise designating the width W of the separated segment directly as being the width of a detected object.

In executing steps S110, S150 of FIG. 4, the computer of this embodiment, in conjunction with the time measurement circuit 30, corresponds to position detection means recited in the appended claims. In executing step S130 of FIG. 4, the computer of this embodiment corresponds to segmentation means recited in the appended claims. In executing step S150 of FIG. 4, the computer of this embodiment corresponds to signal strength distribution detection means recited in the appended claims. In executing steps S220, S210 of FIG. 4, the computer of this embodiment corresponds to region extraction means recited in the appended claims. In executing step S160 of FIG. 4, the computer of this embodiment corresponds to peak number judgment means recited in the appended claims. In executing step S220 of FIG. 4, the computer of this embodiment corresponds to segment separation means recited in the appended claims. The received-light signal strength values described for this embodiment correspond to the received-wave signal strength values recited in the appended claims. However the invention is not limited to the use of light waves to constitute scan beams.

Coefficient Table Configuration

Figure 3:
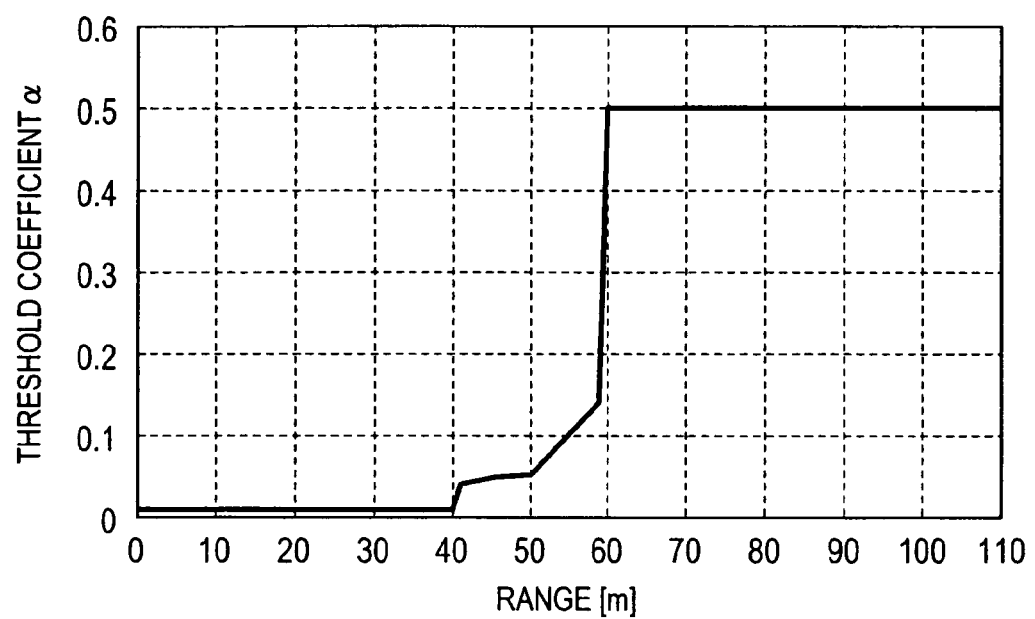
FIG. 3 is a graph showing contents of a stored table which relates object range values to values of a threshold coefficient α.

The coefficient table relates values of the threshold coefficient α ($0<\alpha<1$) to corresponding values of object range (0~110 m) measured as Z-axis distances. The relationship is illustrated by the graph of FIG. 3. As shown, for values of object range which exceed an upper range limit (with this embodiment, 60 m) α is fixed at 0.5. When the range is less than a lower range limit (with this embodiment, 40 m) α is fixed at 0.01. Between these upper and lower limit values of range, α decreases approximately exponentially in accordance with decreasing range. However for reasons described in the following, the manner of decrease is discontinuous rather than a smooth exponential variation.

The relationship between values of object range and corresponding values of the threshold coefficient α is determined such as to minimize errors in estimating the widths of detected objects located at various ranges.

Figure 12:
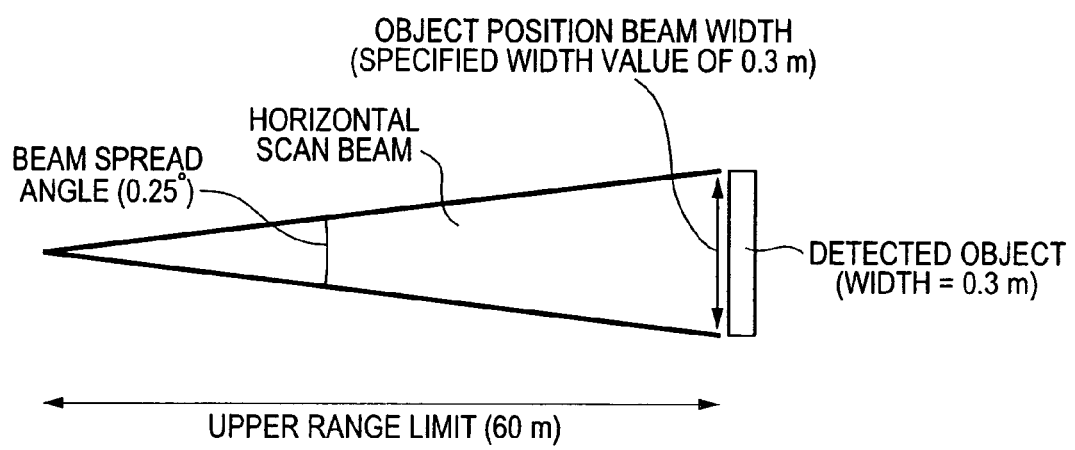
FIG. 12 is a conceptual diagram for illustrating the derivation of an upper range limit value corresponding to an object having a specified width.

As illustrated in FIG. 12, the upper range limit is defined as the object range at which the object position beam width becomes equal to the object width. Thus, the upper range limit is determined by the object width and beam spread angle, in combination. In FIG. 12, the object width is specified as 0.3 m. The coefficient table of this embodiment is established based on this specified object width.

Figure 15A:
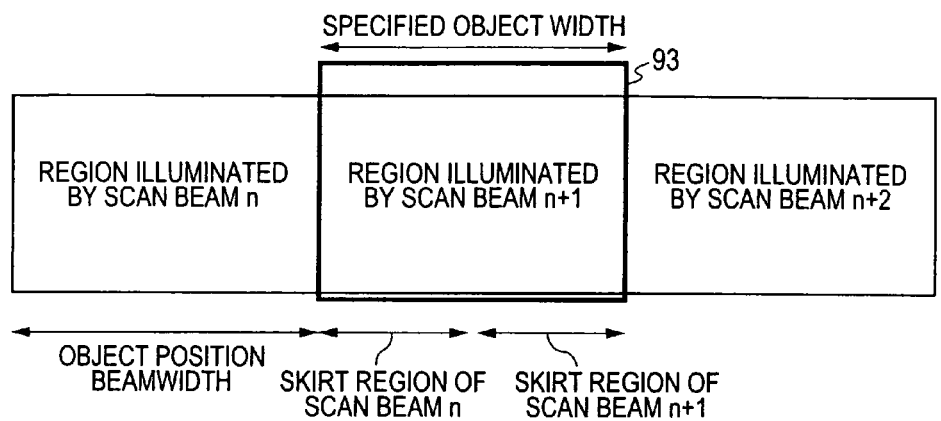
FIGS. 15A, 15B and 16A, 16B are conceptual diagrams illustrating scanning conditions of a detected object, at varying values of object range.

FIG. 15A conceptually illustrates a condition in which an object 93 whose width is the aforementioned specified width is located at the upper range limit, and is fully attained by scan beam n+1. In this condition, the object also reflects light from the respective skirt region of the preceding and succeeding scan beams n and n+2. The intensity of that light extends up to 0.5 times the peak intensity of the reflected light of beam n+1 (as can be understood from FIG. 10B). Hence, the threshold coefficient α is set as 0.5 when processing a segment corresponding to the object 92, to thereby exclude a received-light signal component resulting from the reflected light of skirt regions of transmitted beams.

Figure 15B:
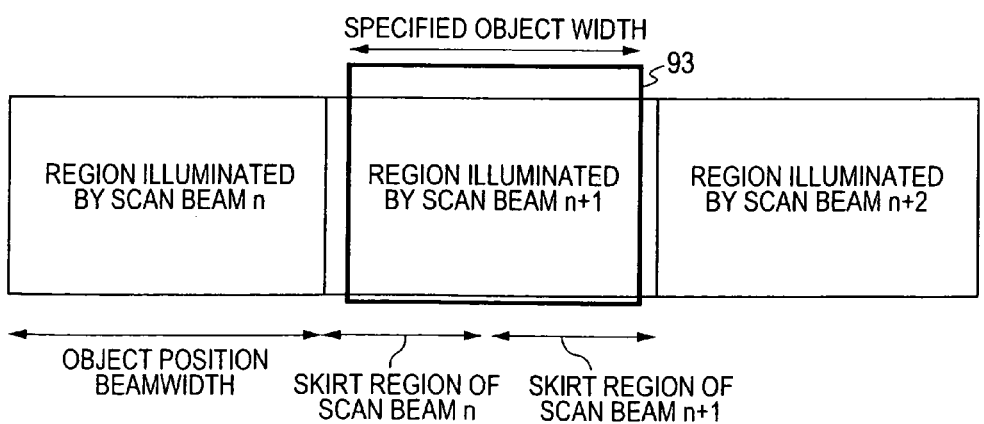

FIG. 15B illustrates the condition in which an object (having the specified object width) is beyond the upper range limit. With this embodiment the threshold coefficient α is held fixed as 0.5, for range values exceeding the upper range limit.

Overestimation of object width, due to effects of the skirt regions of the scan beams when a detected object is beyond the upper range limit, is thus substantially prevented.

Figure 11A:
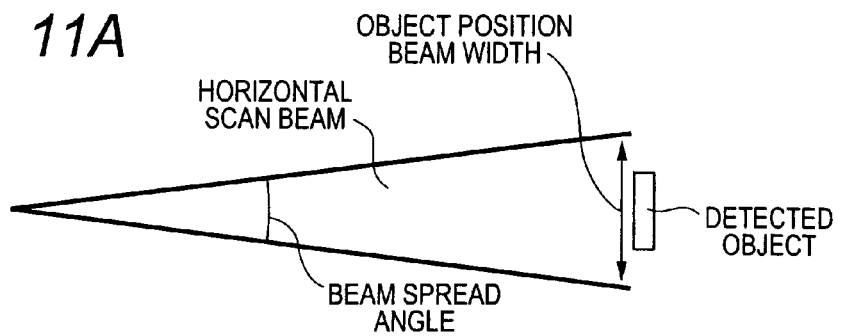
FIGS. 11A to 11C are conceptual diagrams illustrating a relationship between a number of scan beams which attain a detected object and the object range.
Figure 11B:
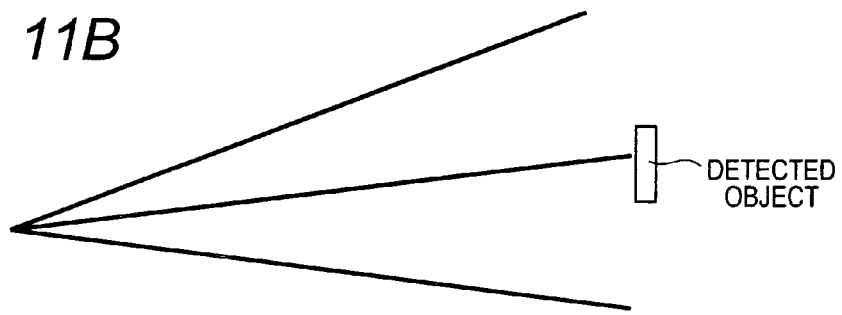
Figure 11C:
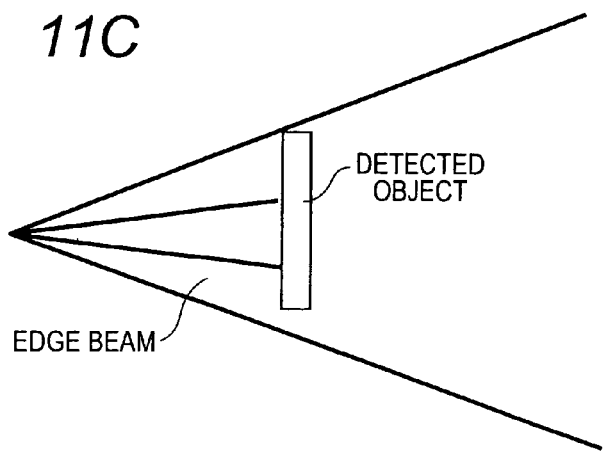

When an object is beyond the upper range limit, as illustrated in FIGS. 11A and 11B, the estimated object width will be either equal to the object position beam width, or twice that value.

Figure 16A:
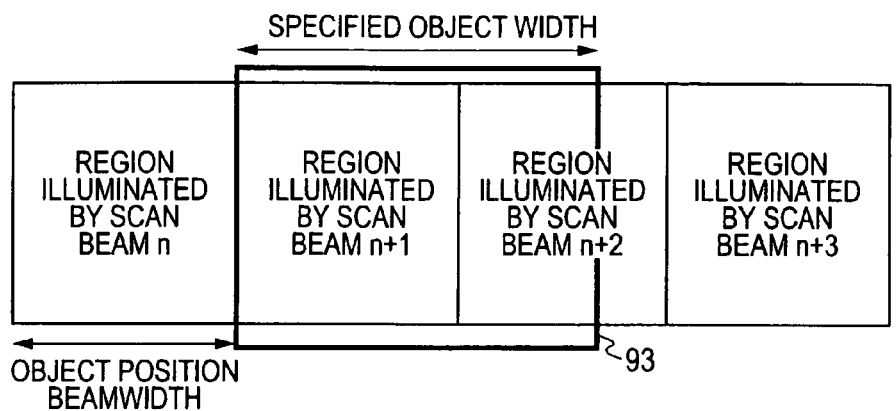
Figure 16B:
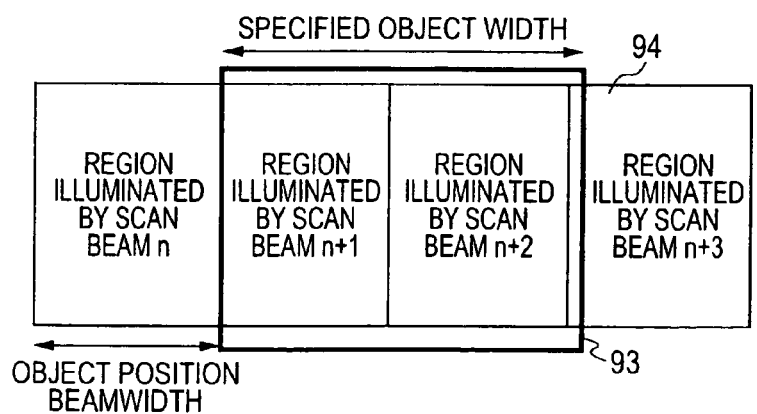

FIG. 16A illustrates the condition in which the range of an object 93 having the aforementioned specific width is between the upper range limit and lower range limit, and is only partially attained by the scan beam n+2. FIG. 16B illustrates the condition in which the range of the object 93 has become slightly less than the lower range limit, the object is illuminated by scan beams n+1 and n+2, but only a partially illuminated edge portion 94 is attained by the succeeding scan beam n+3.

Thus when the object range is below the upper range limit, the estimated object width may be less than the actual object width, if the received-light signal strength corresponding to reflected light from such partially illuminated portions of the object is below the region extraction threshold value THa.

Hence to prevent such underestimation of object width, the threshold coefficient α is successively reduced from 0.5, as the object range decreases below the upper range limit (with this embodiment, 60 m). At the lower range limit, the threshold coefficient α is set as 0.01. As the object range becomes successively less than the lower range limit, so that the object becomes scanned by an increased number of beams, as illustrated in FIG. 7B, the relative size of the partially illuminated portions (such as the portion 71 shown in FIG. 7B) becomes less, so that these portions have proportionally less effect upon the estimated width. Hence, the threshold coefficient α is left fixed at the lower value of 0.01, for values of object range which are less than the lower range limit (with this embodiment, 40 m).

Underestimation of the object width when the object range is less than the upper range limit is thereby prevented.

Figure 7A:
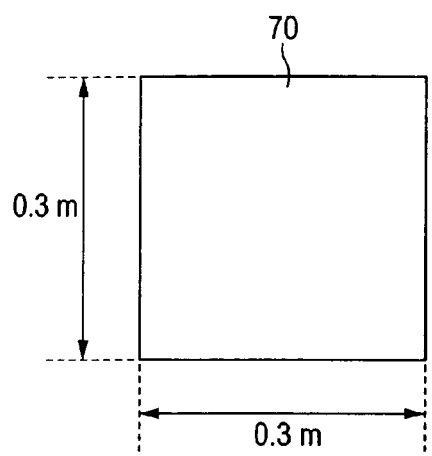
FIGS. 7A and 7B are diagrams for illustrates a partially illuminated edge portion of a detected object, attained by a part of a scan beam.
Figure 7B:
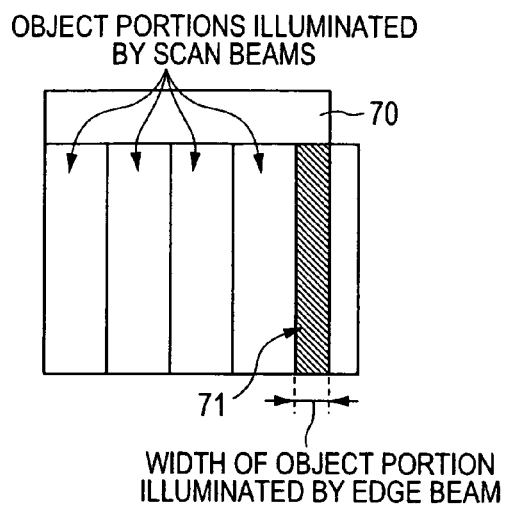
Figure 7C:
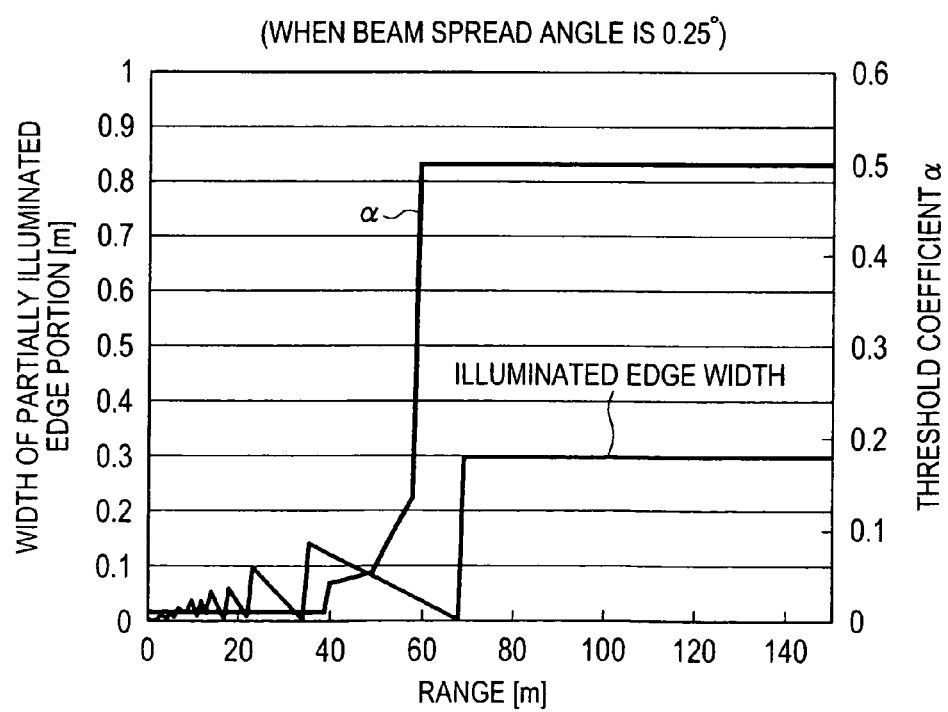
FIG. 7C shows a graph illustrating a relationship between width variation of a partially-illuminated edge portion of a detected object and object range, in conjunction with the graph of FIG. 3.
Figure 8A:
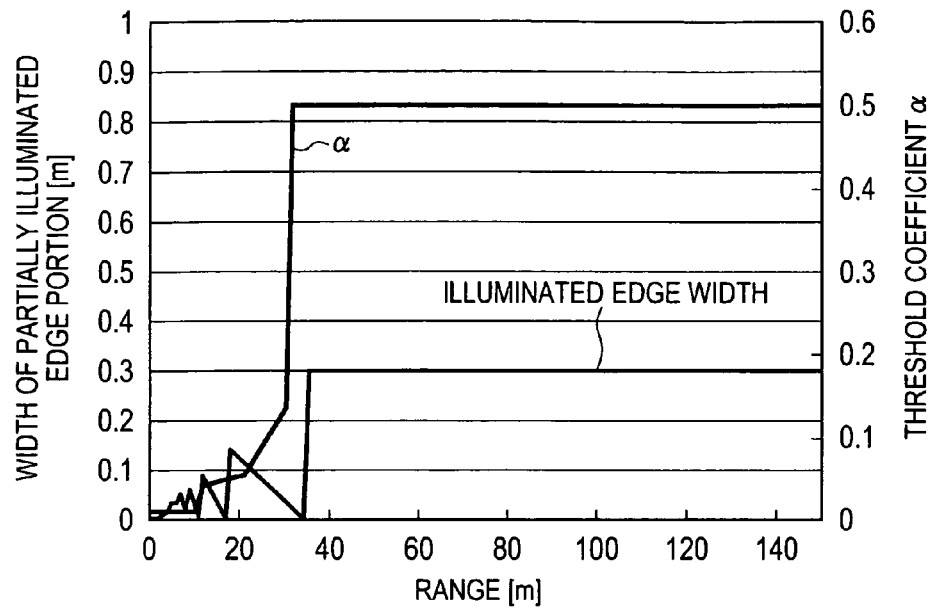
FIGS. 8A and 8B show graphs as for FIG. 7C, for cases of respectively different values of beam spread angle from that of FIG. 7C.
Figure 9:
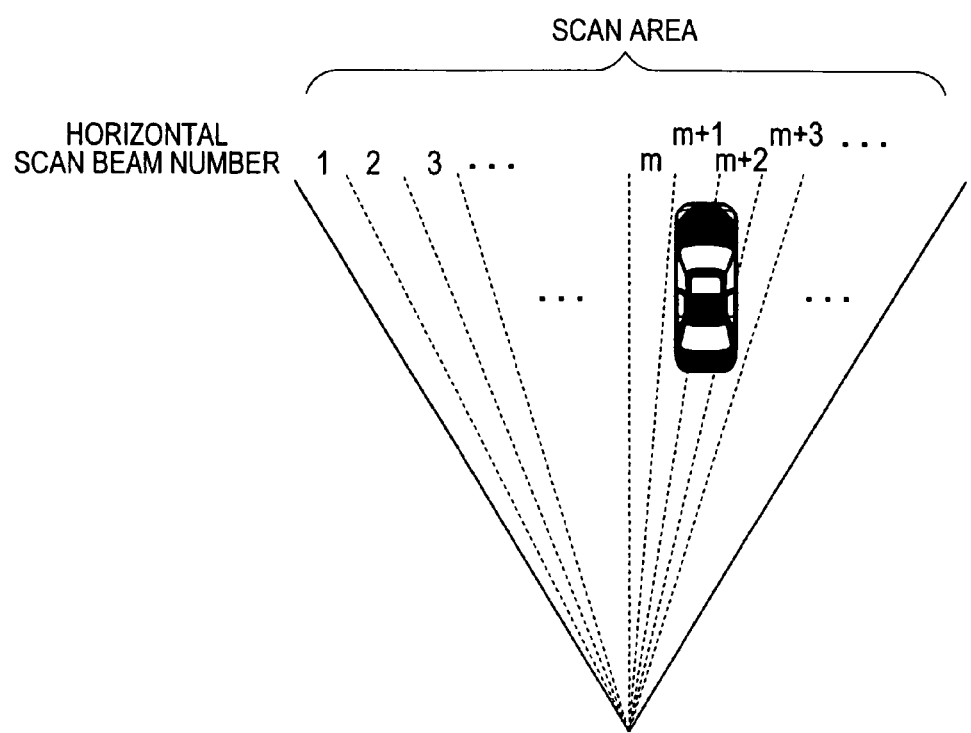
FIG. 9 is a diagram illustrating beam scanning of an object.

At object positions below the upper range limit, the width of a partially illuminated edge portion varies in a discontinuous manner as shown in FIGS. 7C, 8A and 9B. The values of the threshold coefficient α are varied accordingly, as shown in these diagrams.

Figure 8B:
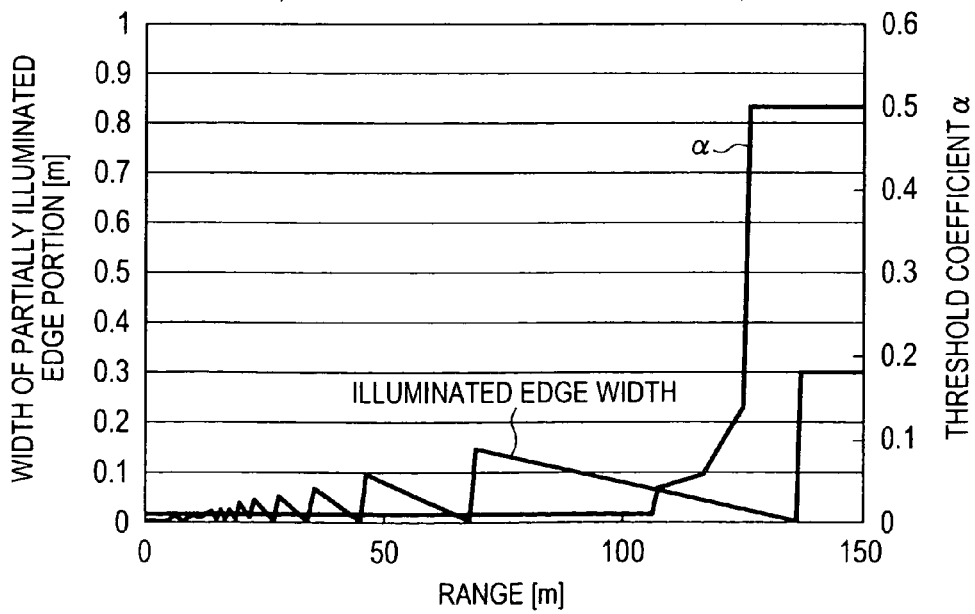

FIG. 8A illustrates the appropriate relationship between values of the threshold coefficient α and object range when the beam spread angle is 0.5°, while FIG. 8B illustrates the appropriate relationship when the beam spread angle is 0.125°. In each case, a specified object width of 0.3 m is assumed. It can thus be understood that various combinations of beam spread angle and specified object width are possible.

In particular in the case of an object recognition apparatus for use in a vehicle, it is essential that the apparatus does not underestimate the width of a detected object, irrespective of the object range. Hence the specified object width, used as a basis for the coefficient table contents (relationship of values of threshold coefficient α to values of range), is preferably determined such as to reliably ensure that the width of a typical type of detected object (e.g., automobile) will not be underestimated. This can be achieved by making the specified object width somewhat smaller than the average width of the typical type of detected object.

The coefficient table which is held stored in a ROM of this embodiment as described above corresponds to means for providing threshold coefficient values as recited in the appended claims. However the invention is not limited to the specific relationships between values of threshold coefficient and range which are shown in FIGS. 7C, 8A and 8B.

Results Obtained

The embodiment enables accurate estimation of detected object width, for objects that may be located at various distances. This is achieved by appropriately adjusting a region extraction threshold value THa in accordance with the estimated range of a detected object, by suitably relating values of the threshold coefficient α to object range values. The embodiment thereby prevents underestimation of the width of a detected object (in particular, when the object range is below the above-described upper range limit), while also preventing overestimation of the object width (in particular, when the object range is above that upper range limit).

In addition, the embodiment enables accurate estimation of the respective widths of two or more objects whose respective locations lie along adjacent angular directions from the object recognition apparatus, with a reduced possibility that these will be detected as being a single object.

Furthermore for segment range (estimated object range) values which exceed the predetermined upper range limit or are less than the predetermined lower range limit, respective fixed values of the threshold coefficient α are utilized. Processing is thereby simplified.

Figure 6:
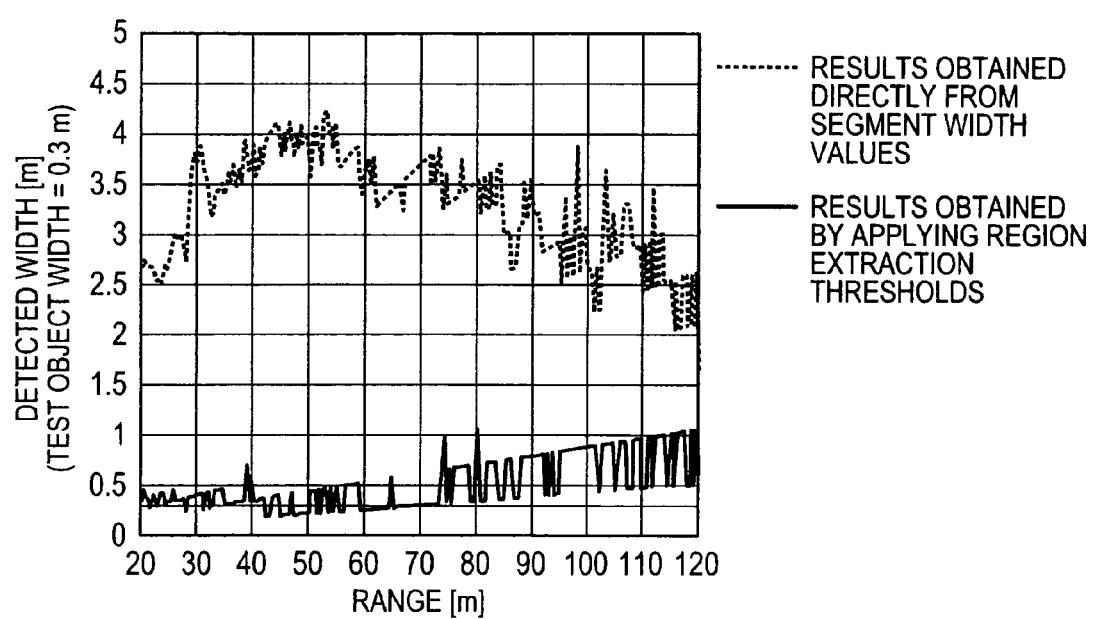
FIG. 6 shows test results of estimating the width of an object when located at various different ranges, by applying processing which does not utilize region extraction and by applying processing which does utilize region extraction.

The graphs of FIG. 6 show results of testing performed to estimate the width of a test object having an actual width of 0.3 m, as for the object 70 shown in FIG. 7A. Firstly, with segment extraction and derivation of corresponding segment width values being performed as described above, respective segments were derived corresponding to each of successive test object ranges between 20 m and 120 m. As shown, with the segment width values being utilized directly as the estimated object width values, the estimated width values differ substantially from the actual object width of 0.3 m.

Estimated range values were then derived for each of the segments and corresponding values of the threshold coefficient α, were thereby obtained for each of the segments. Estimated object width values were then obtained from the segments, by region extraction as described for the above embodiment. As shown, substantially higher accuracy is obtained for the object width estimation results, by comparison with utilizing the segment width directly as the estimated object width.

Other Embodiments

Although the invention has been described above referring to a specific embodiment, it would be possible to envisage various other embodiments, or modifications of the above embodiment, which would fall within the scope claimed for the invention.

For example, although the above embodiment performs scanning by laser light beams, it would be equally possible to utilize beams of millimeter-range electromagnetic waves.

Furthermore with the above embodiment, it is only when a segment is judged to be an over-size segment that a region extraction threshold value THa is used to obtain an estimated object width value from the segment. Otherwise, the segment width is directly specified as being the width of a corresponding detected object. However it would also be possible to apply region extraction processing to all segments, irrespective of segment size.

What is claimed is:

1. An object recognition apparatus for detecting external objects and estimating respective values of width of said objects, the apparatus comprising
scan beam transmitting means configured for performing a sweep of a scanned region by transmitting scan wave beams as respective fixed-duration pulses at respective successively shifted scan angles,
received-wave detection means configured to receive reflected waves resulting from said scan wave beams, and for deriving received-wave signal strength values respectively corresponding to said scan beams during said sweep,
position detection means configured for detecting reflection locations respectively corresponding to said received-wave signal strength values, and respective range values of said reflection locations, and
segmentation means configured for detecting a specific plurality of said reflection locations as constituting a segment, and for calculating a range value of said segment, said specific plurality of reflection locations being disposed respectively adjacent to within a predetermined degree of closeness;
wherein said object recognition apparatus comprises:
signal strength distribution detection means configured to detect a distribution of received-wave signal strength within said segment, and region extraction means configured for
determining a region extraction threshold value based on said range value of said segment;
extracting a region of said segment wherein said received-wave signal strength exceeds said region extraction threshold value; and
specifying a width of said extracted region as being a width of a detected object corresponding to said segment.

2. An object recognition apparatus according to claim 1, comprising means for providing threshold coefficient values each within a range of 0 to 1, said threshold coefficient values varying with respect to said segment range values in a predetermined relationship;
wherein:
said signal strength distribution detection means is configured to detect a peak value of received-wave signal strength within said segment; and
said region extraction means is configured to obtain a one of said threshold coefficient values that corresponds to said range value of said segment, and to multiply said peak value of received-wave signal strength by said obtained threshold coefficient value, for thereby obtaining said region extraction threshold value corresponding to said segment.

3. An object recognition apparatus according to claim 2, wherein said threshold coefficient values become decreased in accordance with decrease of said segment range values.

4. An object recognition apparatus according to claim 2, wherein said threshold coefficient values become decreased in accordance with successive decreases of said segment range values from a predetermined upper range limit value, and whereby said threshold coefficient values are set at a first predetermined fixed value when said upper range limit value is exceeded.

5. An object recognition apparatus according to claim 2, wherein said upper range limit is an object range at which an object position beam width of a scan wave beam is identical to a predetermined object width.

6. An object recognition apparatus according to claim 5, wherein:
said threshold coefficient values are set at a second predetermined fixed value when said segment range values are less than a predetermined lower range limit, said second predetermined fixed value being less than said first predetermined fixed value; and
said threshold coefficient values successively decrease in accordance with decrease of said segment range from said upper range limit to said lower limit value.

7. An object recognition apparatus according to claim 6, wherein said lower range limit is an object range at which said object position beam width of a scan wave beam is equal to one half of said predetermined object width.

8. An object recognition apparatus according to claim 1, wherein:
said region extraction means is applied for deriving said detected object width only when a width of said segment exceeds a predetermined width limit; and
when said segment width is less than said predetermined width limit, said segment width is designated as being said width of a detected object corresponding to said segment.

9. An object recognition apparatus according to claim 8, wherein:
said region extraction means is applied for deriving said detected object width only when said segment width exceeds said predetermined width limit or a highest peak value of received-wave signal strength of said segment exceeds a predetermined signal strength limit; and
when neither of said width limit and said signal strength limit is exceeded, said segment width is designated as being said width of a detected object corresponding to said segment.

10. An object recognition apparatus according to claim 1, comprising segment separation means, and peak number judgment means configured for judging a number of peaks of received-wave signal strength of said segment;
wherein when said segment is judged to contain a plurality of said peaks of received-wave signal strength, said segment separation means operates on each adjacent pair of said peaks by:
detecting a scan angle corresponding to a position of minimum received-wave signal strength between said pair of adjacent peaks; and
separating said segment into a pair of segments, by assigning segment regions containing said pair of peaks to respectively opposing sides of said scan angle.

11. An object recognition apparatus according to claim 1, wherein each of said means is implemented by or controlled by a computer in executing a program.

* * * * *